(12) United States Patent  
Croak et al.

(10) Patent No.: US 7,903,798 B1
(45) Date of Patent: Mar. 8, 2011

(54) METHOD AND APPARATUS FOR MONITORING BLOCKED CALLS IN A COMMUNICATION NETWORK

(75) Inventors: Marian Croak, Fair Haven, NJ (US); Hossein Eslambolchi, Los Altos Hills, CA (US)

(73) Assignee: AT&T Intellectual Property II, L.P., Reno, NV (US)

( * ) Notice: Subject to any disclaimer, the term of this patent is extended or adjusted under 35 U.S.C. 154(b) by 1487 days.

(21) Appl. No.: 11/099,063

(22) Filed: Apr. 5, 2005

(51) Int. Cl.
*H04M 15/00* (2006.01)
(52) U.S. Cl. ............... 379/112.06; 379/112.08; 379/133
(58) Field of Classification Search .................. 370/328, 370/232–234, 352; 379/32.01–32.05, 112.01, 379/112.06, 112.08, 133, 137–139; 455/454
See application file for complete search history.

(56) References Cited

U.S. PATENT DOCUMENTS

| | | | | |
|---|---|---|---|---|
| 5,136,690 A | * | 8/1992 | Becker et al. | 379/136 |
| 5,835,085 A | * | 11/1998 | Eick et al. | 715/853 |
| 6,118,936 A | * | 9/2000 | Lauer et al. | 709/224 |
| 6,345,087 B1 | * | 2/2002 | Batham | 379/32.05 |
| 2005/0064875 A1 | * | 3/2005 | Gonsalves et al. | 455/454 |
| 2006/0182034 A1 | * | 8/2006 | Klinker et al. | 370/238 |

* cited by examiner

*Primary Examiner* — Quoc D Tran

(57) ABSTRACT

Method and apparatus for monitoring blocked calls in a communication network is described. In one example, calls in network segments of a packet network are monitored. A graphic representation of each of the network segments is displayed. A block call threshold is associated with each of the network segments. Each of the network segments is monitored to identify a number of blocked calls. For each network segment, the graphic representation is automatically modified to indicate an alarm in response to the number of blocked calls identified for the network segment exceeding the blocked call threshold associated with the network segment.

20 Claims, 5 Drawing Sheets

200

400

METHOD AND APPARATUS FOR MONITORING BLOCKED CALLS IN A COMMUNICATION NETWORK

BACKGROUND OF THE INVENTION

1. Field of the Invention

Embodiments of the present invention generally relate to telecommunications systems and, more particularly, to a method and apparatus for monitoring blocked calls in a communication network.

2. Description of the Related Art

Generally, telecommunications systems provide the ability for two or more people or machines (e.g., computerized or other electronic devices) to communicate with each other. A telecommunications system may include various networks for facilitating communication that may be generally organized into packet networks and circuit-switched networks. An exemplary circuit-switched network includes a plain old telephone system (POTS), such as the publicly switched telephone network (PSTN). Exemplary packet networks include internet protocol (IP) networks, asynchronous transfer mode (ATM) networks, frame-relay networks, and the like. One type of packet network is a voice-over-internet protocol (VOIP) network.

In a VOIP network, operators frequently receive data indicative of blocked calls occurring in the end-to-end network. For example, calls may be blocked (i.e., not established) due to congestion in the network. Typically, the blocked call data comprises a count and description of the nature of the blocked calls (e.g., 600 blocked calls with cause code 102—timer expirer). Blocked call data, however, is often ambiguous, requiring extensive exploration of the problem before it can be repaired. Accordingly, there exists a need in the art for an improved method and apparatus for monitoring blocked calls in a communication network.

SUMMARY OF THE INVENTION

Method and apparatus for monitoring blocked calls in a communication network is described. In one embodiment, calls in network segments of a packet network are monitored. A graphic representation of each of the network segments is displayed. A block call threshold is associated with each of the network segments. Each of the network segments is monitored to identify a number of blocked calls. For each network segment, the graphic representation is automatically modified to indicate an alarm in response to the number of blocked calls identified for the network segment exceeding the blocked call threshold associated with the network segment.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
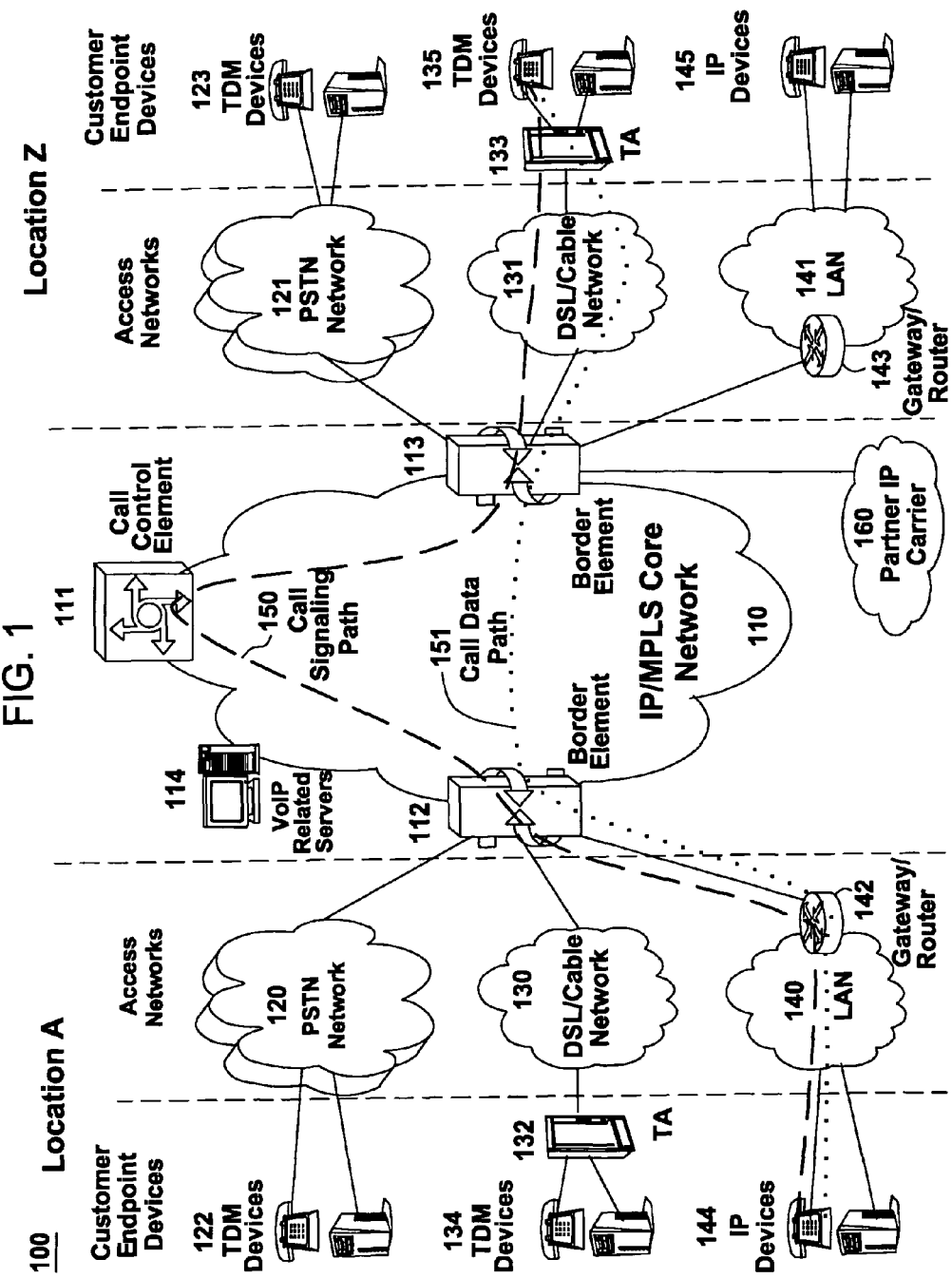
FIG. 1 is a block diagram depicting an exemplary embodiment of a communication system in accordance with the invention.

To better understand the present invention, FIG. 1 illustrates an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

Referring to FIG. 1, the customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, and VoIP related servers 114. The BE resides at the edge of the VoIP core infrastructure and interfaces with customers endpoints over various types of access networks. BEs may also be referred to as "edge components." A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related servers in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related server 114 to obtain the information to complete this call. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP-ACK message if SIP is used, is sent in the reverse direction back to the CCE 111. After the CCE 111 receives the call acknowledgement message, it will then send a call acknowledgement signaling message, such as a SIP-ACK message if SIP is used, toward the calling party. In addition, the CCE 111 also provides the necessary information of the call to both BE 112 and BE 113 so that the call data exchange can proceed directly between BE 112 and BE 113. The call signaling path 150 and the call data path 151 are illustratively shown in FIG. 1. Note that the call signaling path and the call data path are different because once a call has been setup up between two endpoints, the CCE 111 does not need to be in the data path for actual direct data exchange.

Note that a customer in location A using any endpoint device type with its associated access network type can communicate with another customer in location Z using any endpoint device type with its associated network type as well. For instance, a customer at location A using IP customer, endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Figure 2:
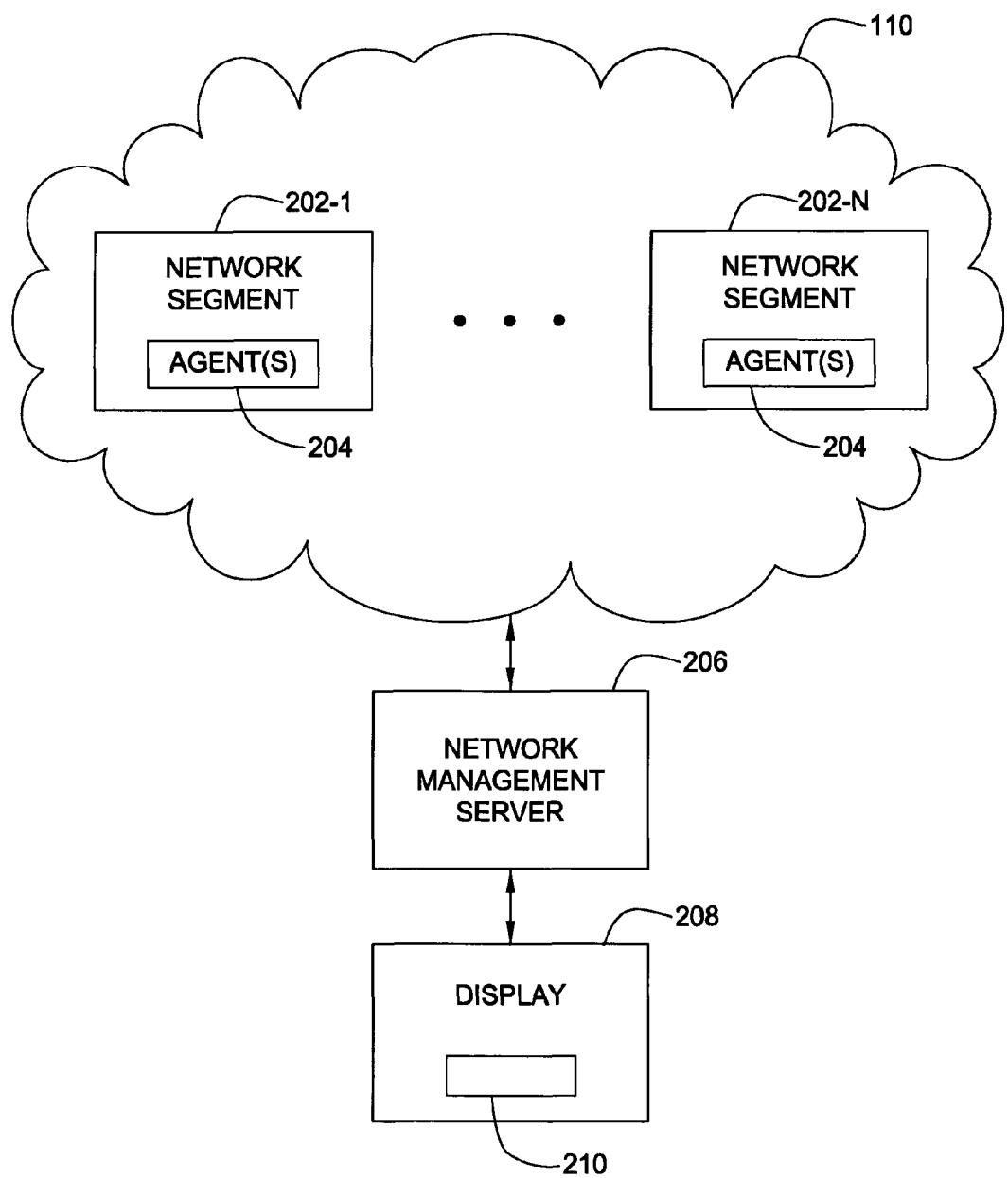
FIG. 2 is a block diagram depicting an exemplary embodiment of a network management system constructed in accordance with one or more aspects of the invention.

FIG. 2 is a block diagram depicting an exemplary embodiment of a network management system 200 constructed in accordance with one or more aspects of the invention. The system 200 is configured to manage the core network 110, described above. The core network 110 is illustratively shown as including network segments 202-1 through 202-N (collectively referred to as network segments 202), where N is an integer. The network segments 202 may include one or more network elements (e.g., call control elements, border elements, servers, and the like), one or more communication links between network elements, or a combination thereof. Each of the network segments 202 includes at least one management agent 204. Each management agent 204 is configured to monitor the state of all or a portion of its respective network segment. Notably, each management agent 204 is configured to monitor the number of blocked calls.

The system 200 includes a network management server 206 for monitoring each network management agent 204 in the network segments 202. Notably, the network management server 206 is configured to collect the number of blocked calls identified by each network management agent 204 for display on a display 208. The network management server 206 is configured to display the blocked call information via a graphical user interface (GUI) 210. In particular, the network management server 206 is configured to generate a visual representation of the blocked calls occurring in the core network 110. In one embodiment, the visual representation includes the location of blocked calls in a map of the network, including the count and criticality of the blockage on an element-by-element basis. Notably, each of the network segments 202 is associated with a blocked call threshold. The network management server 206 provides a visual indication of an alarm if the number of block calls in a network segment exceeds its blocked call threshold.

Figure 3:
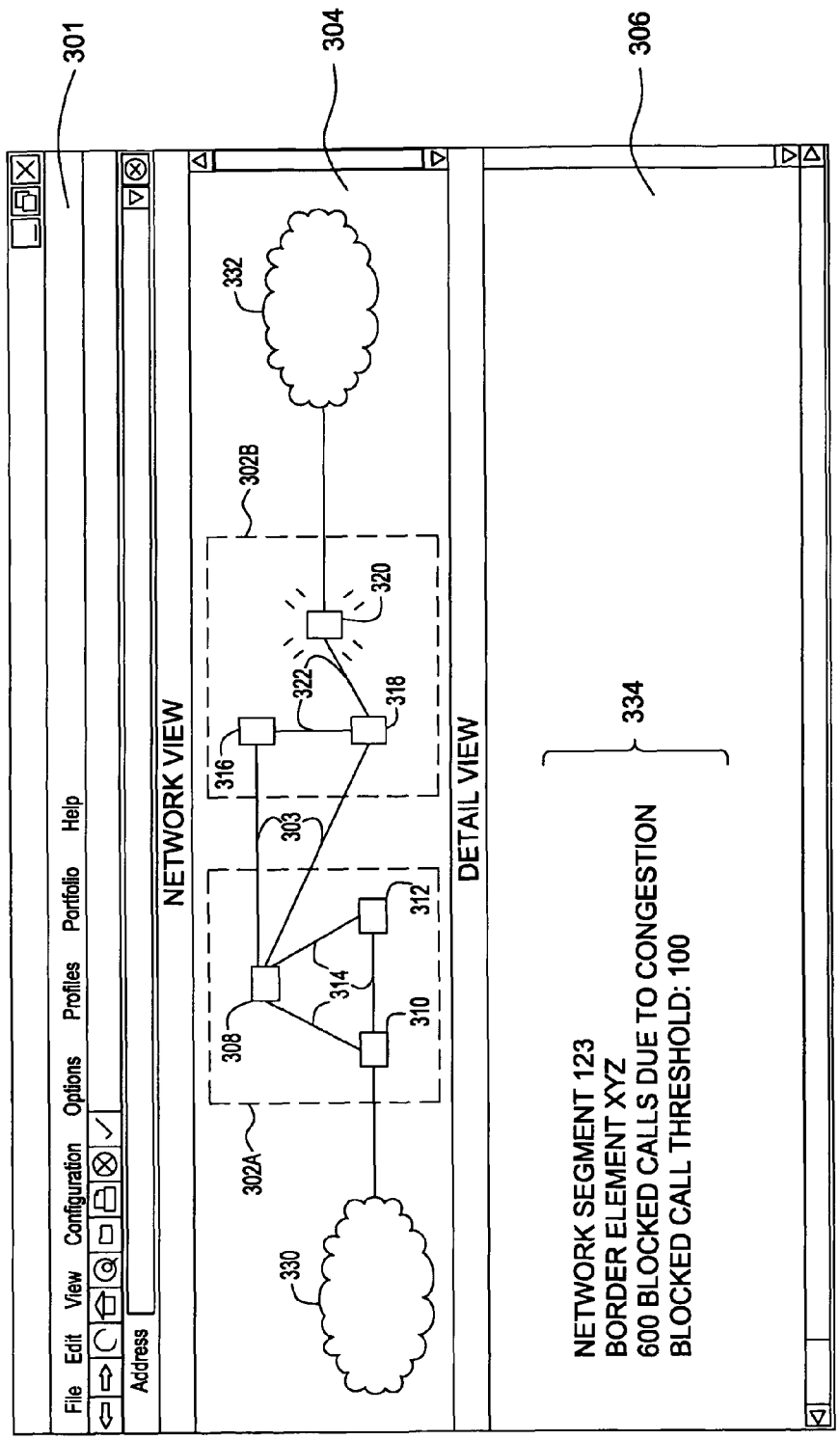
FIG. 3 is a diagram illustrating an exemplary graphical user interface in accordance with the invention.

Notably, FIG. 3 is a diagram illustrating an exemplary GUI 210 in accordance with the invention. The GUI 210 comprises a menu bar 301, a network view pane 304, and a detail view pane 306. The menu bar 301 includes various drop-down menus that can be activated by a user in order to interact with and control the GUI 210, as is well known in the art. The network view pane 304 includes a graphical view of at least a portion of the core network 110. In the present example, the view includes a network segment 302A and a network segment 302B coupled by connection link icons 303. The network segment 302A includes network element icons 308, 310, and 312 and connection link icons 314. The network segment 302B includes network element icons 316, 318, and 320 and connection link icons 322. The network segment 302A is in communication with an access network 330, and the network segment 302B is in communication with an access network 332. In the present example, the number of blocked calls in the network element 320 exceeds the threshold number of blocked calls for the network segment 302B. The network view pane 304 includes a graphical alarm representation associated with the network element 320 (e.g., the network element 320 may change color and/or blink or otherwise provide an indication of an alarm distinguishable from a nominal state). In this manner, the criticality of the blocked calls is highlighted for the user. Those skilled in the art will appreciate that the network view pane 304 may be configured to show other types of icons, text, bitmaps, and the like, as well as combinations thereof that are representative of the core network 110.

The detail view pane 306 includes a graphical representation of a particular network element, network segment, or communication link that is selected by the user. In the present example, the detail view pane includes textual information 334 related to the network element 320. The network element 302 is a border element having an identifier XYZ and being located in a network segment having an identifier 123. The border element is experiencing 600 blocked calls due to congestion (e.g., the border element may be configured to block calls if handling a certain number of active calls). The blocked call threshold associated with the border element 320 is 100 blocked calls. Those skilled in the art will appreciate that other types of information may be displayed in the detail view pane 306 using text, icons, bitmaps, and the like, as well as combinations thereof that are representative of network segments, network elements, and communication links of the core network 110.

Figure 4:
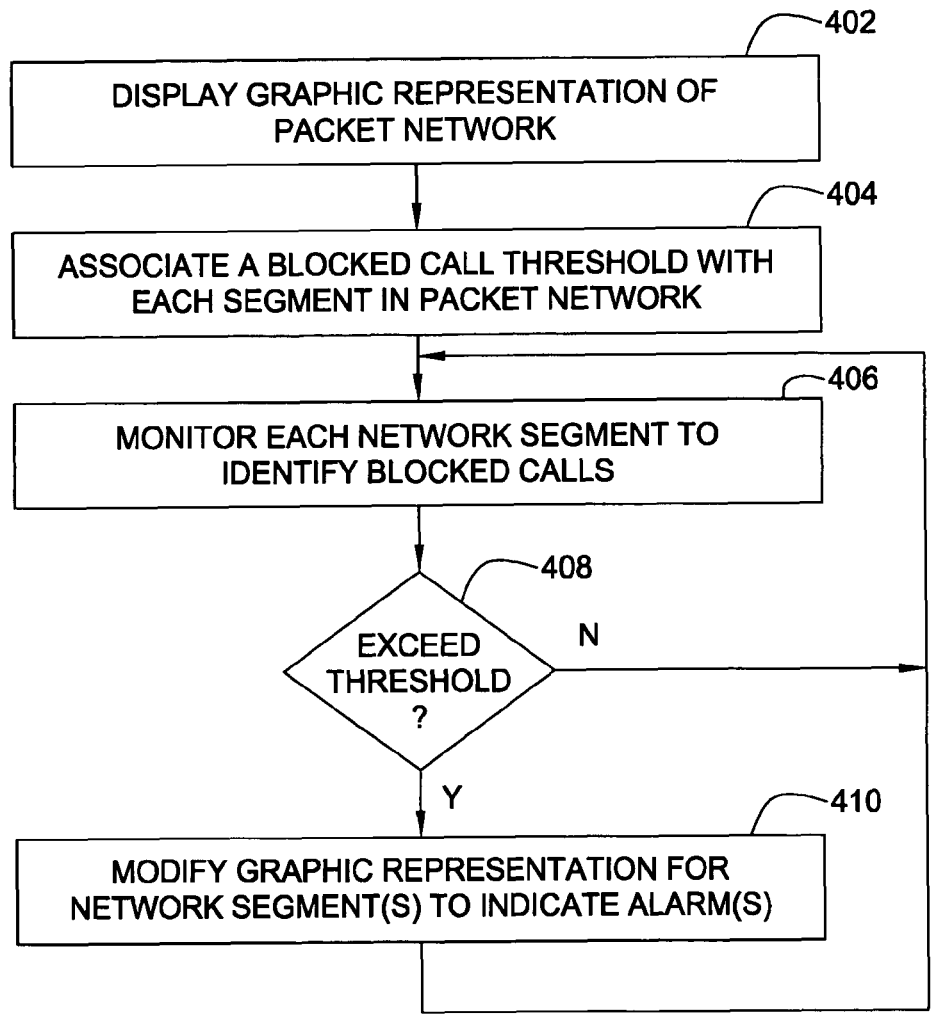
FIG. 4 is a flow diagram depicting an exemplary embodiment of a method for monitoring calls in network segments of a packet network in accordance with one or more aspects of the invention.

FIG. 4 is a flow diagram depicting an exemplary embodiment of a method 400 for monitoring calls in network segments of a packet network in accordance with one or more aspects of the invention. The method 400 begins at step 402, where a graphical representation of the packet network is displayed. At step 404, a blocked call threshold is associated with each network segment in the packet network. At step 406, each network segment is monitored to identify blocked calls. At step 408, a determination is made whether a number of blocked calls identified in any of the network segments exceeds a respective blocked call threshold. If not, the method 400 returns to step 406 and repeats. Otherwise, the method 400 proceeds to step 410. At step 410, the graphical representation is modified for each network segment having blocked calls that exceed its assigned threshold to indicate a blocked call alarm. The method 400 returns to step 406 and repeats.

Figure 5:
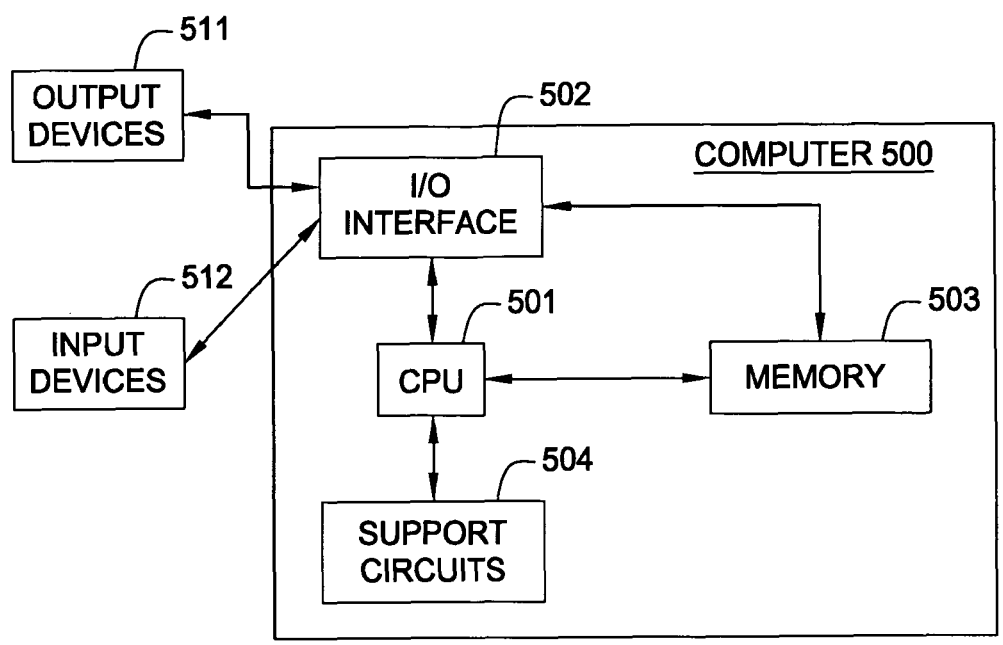
FIG. 5 is a block diagram depicting an exemplary embodiment of a computer suitable for implementing the processes and methods described herein.

FIG. 5 is a block diagram depicting an exemplary embodiment of a computer 500 suitable for implementing the processes and methods described herein. The computer 500 includes a central processing unit (CPU) 501, a memory 503, various support circuits 504, and an I/O interface 502. The CPU 501 may be any type of microprocessor known in the art. The support circuits 504 for the CPU 501 include conventional cache, power supplies, clock circuits, data registers, I/O interfaces, and the like. The I/O interface 502 may be directly coupled to the memory 503 or coupled through the CPU 501. The I/O interface 502 may be coupled to various input devices 512 and output devices 511, such as a conventional keyboard, mouse, printer, display, and the like.

The memory 503 may store all or portions of one or more programs and/or data to implement the processes and methods described herein. Although one or more aspects of the invention are disclosed as being implemented as a computer executing a software program, those skilled in the art will appreciate that the invention may be implemented in hardware, software, or a combination of hardware and software. Such implementations may include a number of processors independently executing various programs and dedicated hardware, such as ASICs.

The computer 500 may be programmed with an operating system, which may be OS/2, Java Virtual Machine, Linux, Solaris, Unix, Windows, Windows95, Windows98, Windows NT, and Windows2000, WindowsME, and WindowsXP, among other known platforms. At least a portion of an operating system may be disposed in the memory 503. The memory 503 may include one or more of the following random access memory, read only memory, magneto-resistive read/write memory, optical read/write memory, cache memory, magnetic read/write memory, and the like, as well as signal-bearing media as described below.

An aspect of the invention is implemented as a program product for use with a computer system. Program(s) of the program product defines functions of embodiments and can be contained on a variety of signal-bearing media, which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the invention, represent embodiments of the invention.

While the foregoing is directed to embodiments of the present invention, other and further embodiments of the invention may be devised without departing from the basic scope thereof, and the scope thereof is determined by the claims that follow.

The invention claimed is:

1. A method of monitoring calls in network segments of a packet network, comprising:
    displaying a graphic representation of each of the network segments;
    monitoring each of the network segments to identify a number of blocked calls; and
    for each network segment, automatically modifying the graphic representation for the network segment as displayed on a view pane to indicate an alarm in response to the number of blocked calls identified for the network segment exceeding a blocked call threshold associated with the network segment.

2. The method of claim 1, wherein each of the network segments comprises at least one of: (a) at least one network element, and (b) at least one communication link.

3. The method of claim 2, wherein the at least one network element comprises at least one of: a call control element and a border element.

4. The method of claim 1, wherein the graphic representation of each of the network segments is displayed via a graphical user interface.

5. The method of claim 1, wherein the automatically modifying further comprises:
    displaying a count indication for the number of blocked calls identified for the network segment.

6. The method of claim 1, wherein the packet network comprises a services-over-internet protocol network.

7. The method of claim 1, wherein the packet network comprises a voice-over-internet protocol network.

8. Apparatus for monitoring calls in network segments of a packet network, comprising:
    means for displaying a graphic representation of each of the network segments;
    means for monitoring each of the network segments to identify a number of blocked calls; and
    means for automatically modifying, for each network segment, the graphic representation for the network segment as displayed on a view pane to indicate an alarm in response to the number of blocked calls identified for the network segment exceeding a blocked call threshold associated with the network segment.

9. The apparatus of claim 8, wherein each of the network segments comprises at least one of: (a) at least one network element, and (b) at least one communication link.

10. The apparatus of claim 9, wherein the at least one network element comprises at least one of: a call control element and a border element.

11. The apparatus of claim 8, wherein the means for modifying comprises a display having a graphical user interface.

12. The apparatus of claim 8, wherein the means for automatically modifying further comprises:
   a means for displaying a count indication for the number of blocked calls identified for the network segment.

13. The apparatus of claim 8, wherein the packet network comprises a services-over-internet protocol network.

14. The apparatus of claim 8, wherein the packet network comprises a voice-over-internet protocol network.

15. A computer readable medium having stored thereon instructions that, when executed by a processor, cause the processor to perform a method of monitoring calls in network segments of a packet network, comprising:
   displaying a graphic representation of each of the network segments;
   monitoring each of the network segments to identify a number of blocked calls; and
   for each network segment, automatically modifying the graphic representation for the network segment as displayed on a view pane to indicate an alarm in response to the number of blocked calls identified for the network segment exceeding a blocked call threshold associated with the network segment.

16. The computer readable medium of claim 15, wherein each of the network segments comprises at least one of: (a) at least one network element, and (b) at least one communication link.

17. The computer readable medium of claim 16, wherein the at least one network element comprises at least one of: a call control element and a border element.

18. The computer readable medium of claim 15, wherein the graphic representation of each of the network segments is displayed via a graphical user interface (GUI).

19. The computer readable medium of claim 15, wherein the automatically modifying further comprises:
   displaying a count indication for the number of blocked calls identified for the network segment.

20. The computer readable medium of claim 15, wherein the packet network comprises a voice-over-internet protocol network.

* * * * *